June 23, 1970 R. G. MOORE, JR 3,516,250
FUEL CONTROL SYSTEM FOR TURBO-SHAFT ENGINES
Filed Aug. 20, 1968 2 Sheets-Sheet 1

INVENTOR.
ROBERT G. MOORE, JR.
BY M. A. Hobbs
ATTORNEY

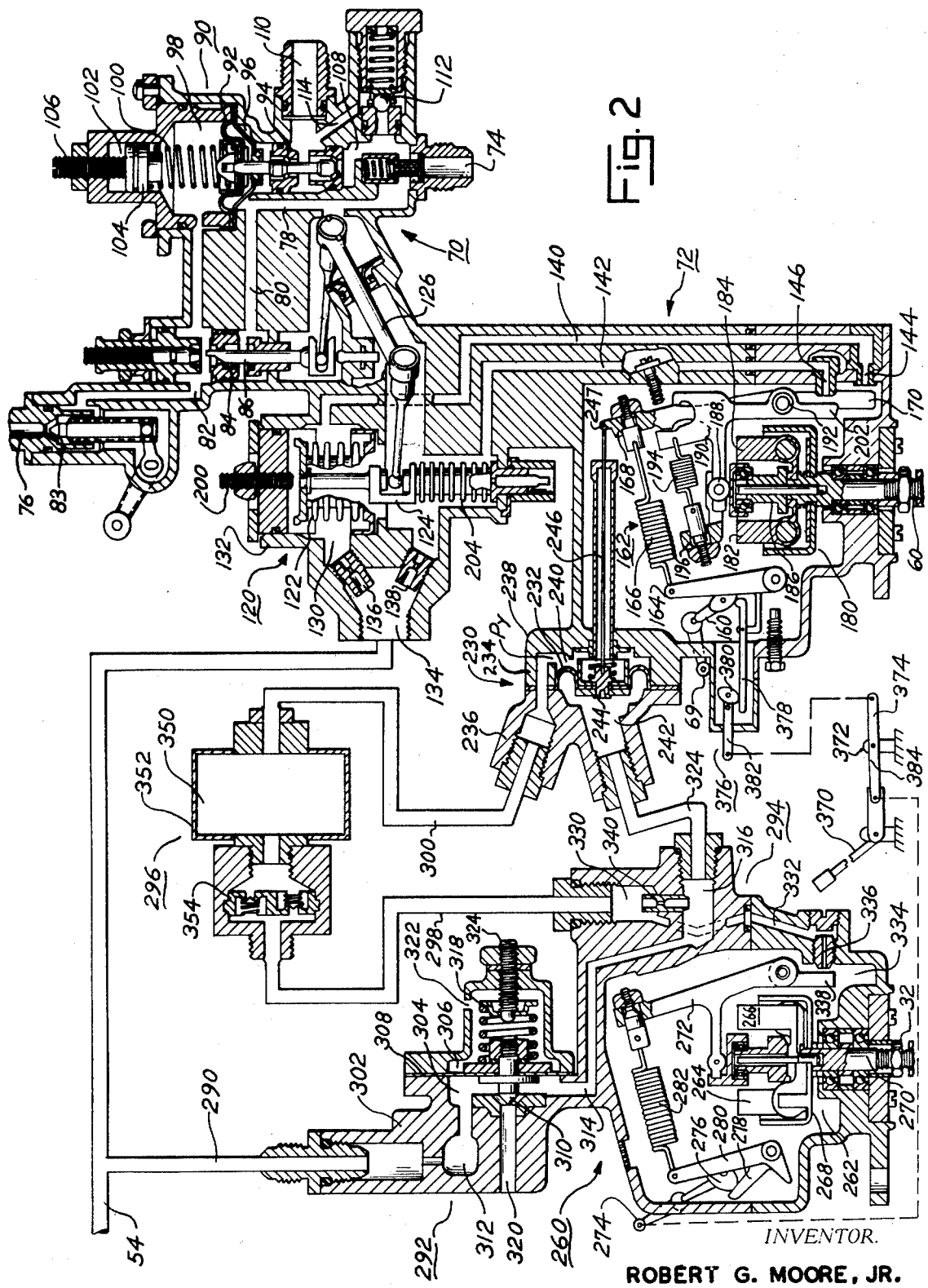

United States Patent Office 3,516,250
Patented June 23, 1970

3,516,250
FUEL CONTROL SYSTEM FOR TURBO-SHAFT ENGINES
Robert G. Moore, Jr., South Bend, Ind., assignor to The Bendix Corporation, a corporation of Delaware
Filed Aug. 20, 1968, Ser. No. 754,081
Int. Cl. F02c 3/10, 9/08
U.S. Cl. 60—39.16                    10 Claims

ABSTRACT OF THE DISCLOSURE

A fuel control system for a free turbine engine having a fuel valve governor responsive to compressor pressure for controlling a fuel control valve, a governor responsive to compressor speed for controlling the fuel valve, the latter governor responsive to the free turbine for resetting the first governor in response to changes in load, and a collective reset linkage interconnecting the two governors so that any change in the setting of the load on the second governor immediately changes the setting on the first governor, whereby immediate response to any change in load on the second governor is translated into a corresponding setting on the first governor.

---

Figure 1:
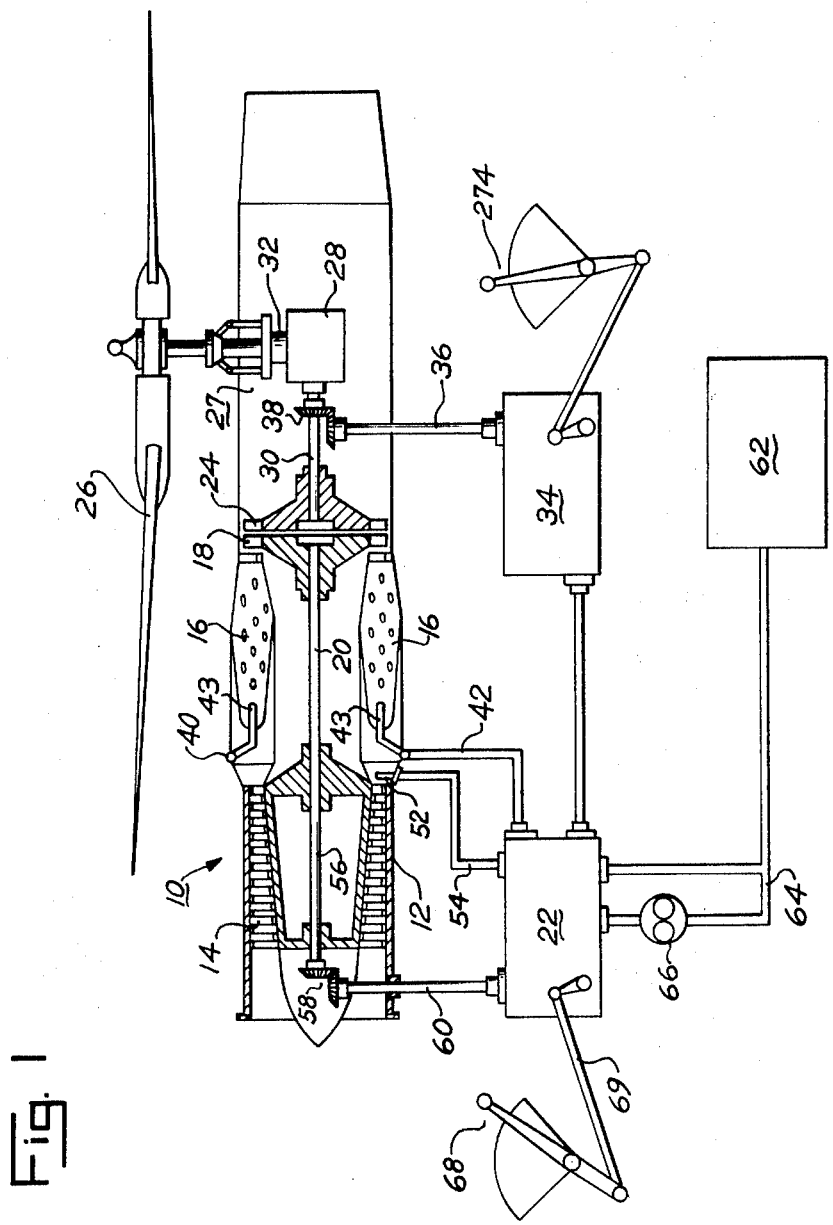

The present fuel control system is used with turbo-shaft engines consisting basically of a gas or energy producing section and a power take-off or energy absorbing section, the gas producing section generally including a compressor, combustion chambers and a turbine for driving the compressor, and the power take-off section including an independently rotatable power absorbing turbine coupled to an output drive shaft for driving a load such as the rotor of a helicopter. The fuel control system with which the present invention is concerned contains a fuel metering section controlled by an adjustable governor and compressor outlet pressure, and a governor controlled reset mechanism for resetting the first governor in response to changes in speed, torque, or power delivered by the power takeoff turbine. The present fuel system of this type normally includes a means such as an accumulator or the like for maintaining a stable condition during the resetting operation. This type of means, however, has resulted in a rather poor response of the system to changes in power or load requirements of the output shaft of the energy absorbing section. It is therefore one of the principal objects of the present invention to provide a means for improving or increasing the responsiveness of the system to load changes without sacrificing the stability of the system.

Another object of the present invention is to provide a relatively simple pilot controlled adjustment means which temporarily augments the reset mechanism to obtain immediate response to changes in load conditions, and which permits the accumulator or other system stabilizer to function normally in conjunction with the operation of the means.

Still another object of the invention is to provide, in a system of the aforesaid type, a mechanical linkage between the pilot load control lever and the gas producer governor, which resets the governor before the normal reset governor has had the opportunity to perform the resetting function, and which provides prompt response and optimum operation of the engine to the changed load conditions.

Further objects and advantages of the invention will become apparent from the following description and accompanying drawings, wherein:

FIG. 1 is a diagrammatic view of a free turbine engine embodying the present invention and shown in a helicopter installation; and FIG. 2 is a schematic cross sectional view of the fuel control system shown diagrammatically in FIG. 1 and illustrating the construction and operation of the invention.

Referring more specifically to the drawings and to FIG. 1 in particular, numeral 10 designates generally a free turbine engine with which the present invention is used and which, for the purpose of the present description, may be considered conventional with the exception of the present inveniton embodied therein. Numeral 12 indicates the gas turbine generator section having a compressor 14, a plurality of burners 16 and a turbine 18 which drives the compressor through shaft 20. The control for the generator is indicated by numeral 22 and is of the type driven by a power train from shaft 20 interconnecting the compressor 14 and turbine 18. The power turbine indicated by numeral 24 is connected to rotor 26 of a helicopted by a power trains 27 generally consisting of grear box 28, a shaft 30 connecting the power turbine 24 to the gear box, and the main shaft 32 connecting gear box 28 to the rotor. Also driven from shaft 30 is a governor device 34 driven through shaft 36 by a gear drive 38. The fuel is delivered to the combustion chambers by a manifold 40, lines 42 and nozzles 43. The main fuel control is responsive to compressor outlet pressure sensed by pickup 52 and transmitted through line 54, and to turbine speed transmitted through shaft 56, beveled gears 58, and shaft 60. The fuel is deilvered from the fuel supply, such as a tank 62, through conduit 64 and pump 66 to the main fuel control. The main fuel control is manually controlled by a throttle 68 through linkage 69 connected to the control in the manner illustrated in the drawings, as will be more fully described hereinafter. The present fuel control system shown in the drawings is not limited to the type of engine but is capable of being used in various types of gas turbine engines.

The gas producer control 22 consists basically of a section containing the fuel system and a section containing the pneumatic circuit, indicated generally by numerals 70 and 72, respectively. The fuel section is connected to the fuel supply source by conduit 64 which in turn is connected to inlet passage 74, and outlet passage 76 is connected to conduit 42, manifold 40, and discharge nozzles 43 in burners 16. The inlet and outlet passages are connected in the control by unmetered fuel passages 78 and 80 and metered fuel passage 82 and cut-off valve 83 with a metering orifice 84 being disposed between passages 80 and 82 and containing a contoured valve 86 operated in response to pressure variations in the air circuit of section 72. The pressure drop across orifice 84 is controlled by a pressure regulator generally indicated by numeral 90 and consisting of a diaphragm 92 and a valve 94 operated by the diaphragm in response to the differential in pressure between chambers 96 and 98. The pressure differential is adjusted by a spring 100 reacting between diaphragm 92 and an adjustment means 102 consisting of a movable cylinder 104 and an adjustment screw 106. As valve 94 is moved longitudinally in response to variations in pressure between chambers 96 and 98, fuel is returned to the source of supply from conduit 108 through conduit 110. A relief valve 112 of the ball-check type is connected between passage 74 and return passage 110 by the valve and by-pass passage 114. In the foregoing system, the fuel is maintained at a substantially constant differential on opposite sides of the metering orifice 84 and the position of metering valve 86 is varied to obtain the required fuel flow.

The fuel valve 86 is controlled by a pressure responsive device indicated generally by numeral 120 and consisting of a main control bellows 122 connected to valve 86 by a stem 124 and a pivoted linkage 126 so that movement of the bellows downwardly, as viewed in FIG. 2, results in an increase in opening of valve 86. Bellows 122 is disposed in chamber 130 in housing 132 which is connected to compressor discharge pressure through conduit 54 and conduit 134, and through orifices 136 and 138 on the external and internal sides of the bellows, respectively. The external and internal pressures on the bellows are connected to pressure control unit 72 by passages 140 and 142, respectively, and the differential between the external and internal pressures is controlled by controling the flow through orifices 144 and 146. Orifice 144 is controlled primarily by throttle 68 through linkage 69, cam assembly 160 and linkage 162 consisting of lever 164, spring 166, and lever 168. When the throttle is moved in the direction to increase the speed, the tension on spring 166 is increased, thereby tending to move lever 168 in the direction to seat valve 170 on orifice 144. The speed governor 180, which is driven from the turbine through shafts 20, 56 and 60, causes weights 182 and 184 to move outwardly in response to the speed thereof and to shift sleeve 186 upwardly against roller 188. The roller is supported on a lever 190 which is pivoted on a pin 192 and held in position to resist the outward movement of the two weights by spring 166 and spring 194, the latter spring reacting between the upper end of lever 190 and an anchor means 196 supported by lever 168.

As the weights move out in response to an increase in turbine speed, lever 190 is first moved angularly in a clockwise direction, engaging lever 168, which in turn operates control valve 170. As lever 190 moves further in the clockwise direction in response to the outward movement of the centrifugal weights 182 and 184, spring 194 yields sufficiently to permit the upper end of the lever to engage lever 168 and move the lever in the direction to open valve 170. As valve 170 is opened, the pressure in chamber 130 on the external side of bellows 122 is decreased. This causes bellows 122 to expand and move stem 124 upwardly and, through linkage 126, move valve 86 toward closed position, thus establishing a steady state running condition for the particular throttle position as determined by the operation of lever 68.

When the throttle is moved in the direction to decelerate, lever 168 tends to move in the clockwise direction, further opening valve 170 and causing a further decrease in pressure in chamber 130 externally of the bellows. This causes stem 124 to move upwardly, thereby moving linkage 126 in the direction to close metering valve 86. Bellows 122 may expand until it seats against adjustable stop 200, and an evacuated bellows 204 operating on the lower side of stem 124 controls metering valve 86 in response to changes in compressor discharge pressure so that the closing of the metering valve is proportional to compressor discharge pressure as modified by the spring rate of bellows 122. Further, as weights 182 and 184 move outwardly in response to an increase in turbine speed, lever 190 having a control valve 202 at the lower end thereof controls orifice 146. As valve 202 is retracted from the orifice, the pressure on the internal side of bellows 122 is decreased, causing stem 124 to move downwardly, and through linkage 126, moving valve 86 toward open position to increase the flow of fuel to the engine. Thus, valve 202 and orifice 146, in effect, function as fuel enrichment means for acceleration.

A reset mechanism 230 for automatically adjusting the speed setting of governor 180 as established by the position of the throttle is contained in section 72, and consists of a pressure responsive member or diaphragm 232 secured between sections 234 and 236 of housing 238 so that one side is exposed to fluid pressure in chamber 240 and the other side is exposed to fluid pressure in chamber 242. A plate member 244 is clamped at the center of diaphragm 232 and includes a rod 246 which extends into engagement with an extension 247 of lever 168 so that the force produced by the fluid pressures acting on diaphragm 232 is transmitted to lever 168 in a direction opposing the force applied by setting spring 166. Thus, for a given setting of throttle 68, the force applied by diaphragm 232 to lever 168 is operative to reduce the speed setting from a maximum established by said throttle.

The fluid pressure generating the primary force on diaphragm 232 is designated $P_y$ and its value controls the degree of resetting effected by the diaphragm. Control of $P_y$ pressure is obtained by a reset control section 260 having an adjustable speed governor 262 responsive to output shaft speed, which therefore supplies the controlling force and signal to the reset mechanism 230. The governor includes flyweights 264 and 266 pivotally mounted on table 268 which is rotated by a shaft 270 driven by drive shaft 32. The governor operates a lever 272 which is connected to reset throttle lever 274 by a linkage consisting of cam 276 and levers 278 and 280, and a coil spring 282 connecting lever 280 with the upper end of lever 272. A fluid system for providing the reset control pressure $P_y$ consists of a conduit 290 connected to compressor outlet pressure through conduit 54, pressure regulator 292, control mechanism 294, accumulator 296, and interconnecting conduits 298 and 300 connecting the control mechanism with the accumulator and the accumulator with the reset mechanism 230.

Pressure regulator 292 consists of a housing 302 having chambers 304 and 306 separated by a diaphragm 308 for controlling a valve 310. A passage 312 connects chamber 304 with conduit 290 and passage 314 connects the chamber with chamber 316 of the control mechanism. The diaphragm is regulated by a coil spring 318 which urges valve 310 toward its closed position and thereby controls the flow of air through passage 320 connecting chamber 306 to ambient air pressure by a port 322. The operation of valve 310 may be varied to obtain the desired pressure by an adjustment screw 324. The pressure regulator, for any given ambient air pressure, maintains a substantially constant pressure in chamber 316 and chamber 242, which is connected to chamber 316 by a conduit 324.

The $P_y$ pressure in chamber 240 is varied in accordance with the speed of governor 262 by regulating the pressure in chamber 330 of the control mechanism. This is accomplished by controlling the flow through a passage 332 connecting chamber 330 with chamber 334 of section 260. The flow of air through conduit 332 is controlled by an orifices 336 and valve 338 which is moved toward and away from orifice 336 by the action of lever 272. A restricted orifices 340 connects chamber 316 with chamber 330, thus permitting valve 338 to control effectively the presure in chamber 330. In order to eliminate any sudden change in the reset mechanism, an accumulator 296 is provided between the control mechanism 294 and the reset mechanism 230. The accumulator consists primarily of a relatively large chamber 350 in housing 352 and a set of check valves 354 disposed between the inlet conduit 298 and chamber 350.

In the operation of the reset mechanism, as governor 262 responds to an increase in speed of the output shaft, lever 272 is moved in a clockwise direction as viewed in the drawings, thus opening the valve 338. This causes a reduction in presure in chamber 330 and hence in $P_y$ pressure in chamber 240. With a decrease in pressure in the latter chamber, the diaphragm 232 of the reset mechanism moves rod 246 to the right, thus further opening valve 170, thereby causing a reduction in pressure in chamber 130. As the pressure in chamber 130 is decreased, the bellows 122 expands, causing stem 124 to move upwardly and, through linkage 126, causing the fuel valve 86 to move toward closed position.

One of the important features of the present control system is to provide a better transient response to load changes in the power turbine. This mechanism, which is refered to herein as the collective reset mechanism, consists of a manually operated control lever 370 which operates a dual lever 372 having an arm 374 connected to lever 164 by a linkage 376. This linkage includes a lever 378 pivotally connected to lever 164 and operated by a cam and lever 380 and 382. Arm 384 is connected to throttle lever 274 so that movement of lever 370 in response to an increase in load will cause the control mechanism of governor 180 to obtain a rapid transient response. Lever 372 operates the linkage 162 to decrease the degree of opening of valve 170, thus resulting in a greater pressure in chamber 130, which moves stem 124 downwardly, thereby moving valve 86 toward open position. The collective reseat mechanism also moves the throttle level 274 in the direction to close valve 338 to restrict orifice 336, thereby temporarily increasing the pressure in chamber 240, thus causing an action in the reset mechanism 230, in the direction to further compensate for the increase in load.

The accumulator 296 is included primarily to improve the stability of the operation; however, this results in a somewhat slower respone of the system to changes in the load. The present collective reset mechanism overcomes this normal delay resulting from the accumulator in the system by giving a ready response without interfering with the stabilizing effect of the accumulator. Lever 370 is operated in response to the collective pitch lever of the helicopter rotor, for example, and thus causes the operation to momentarily override the reset mechanism 260. Since lever 372 is connected to throttle 274, the reset section 260 responds to the collective reset and provides a smooth transition following the rapid response to the transient collective reset mechanism.

In the embodiment shown in FIG. 2 of the drawings, the collective reset mechanism operates directly on linkage 162. The direct mechanical operation may be modified by including a pneumatic cylinder or bellows connected to chamber 242 and operated by lever 372 to increase momentarily the pressure in said chamber when load is reduced, thus causing lever 168 to shift to the right as viewed in the drawings and temporarily increase the opening of valve 170. In order to make this modification fully responsive, a restriction is preferably included in conduct 324. The results obtained by this mechanism are the same as those of the direct mechanical collective reset described in detail herein. Other means, including electrical or hydraulic systems, may be used to interconnect lever 372 with reset mechanism 230 in place of the mechanical and pneumatic means described hereinabove.

While only one embodiment of the fuel control system has been described in detail herein, various changes and modifications can be made without departing from the scope of the invention.

The embodiments of the invention in which an exclusive property or privilege is claimed are defined as follows:

1. In a fuel control system for a free turbine engine having a turbine, a burner, a compressor driven by the turbine and a free turbine for driving a load: a fuel metering valve for controlling fuel to said burner, a first governor responsive to compressor speed for regulating said fuel valve, a control means for said governor, a fluid system connected to compressor outlet pressure and including a pressure responsive means for resetting said first governor, and an accumulator for stabilizing the operation of said pressure responsive means when the reset function is being performed, a second governor responsive to free turbine speed for controlling the pressure in said fluid system and thereby controlling the degree of reset effected by said pressure responsive means on said first governor, a control means for said second governor, means interconnecting said first and second governor control means for immediately resetting said first governor in response to a change of load condition on said second governor.

2. A fuel control system as defined in claim 1 in which said interconnecting means between the first and second governor control means consists of a mechanical linkage.

3. A fuel control system as defined in claim 2 in which said control means for each of said governors includes a throttle lever and said mechanical linkage interconnects said throttle levers so that movement of the throttle lever of said second governor resets said first governor.

4. A fuel control system as defined in claim 1 in which said pressure responsive means includes a diaphragm and a mechanical linkage connected to the control means for said first governor.

5. A fuel control system as defined in claim 1 in which said interconnecting means consists of a mechanical linkage connected to the control means for said first governor to reset the governor before said fluid pressure responsive means has effected its resetting operation.

6. A fuel control system as defined in claim 4 in which said interconnecting means consists of a mechanical linkage connected to the control means for said first governor to reset the governor before said fluid pressure responsive means has effected its resetting operation.

7. A fuel control system as defined in claim 1 in which said interconnecting means modifies the setting normally obtained by said pressure responsive means.

8. A fuel control system as defined in claim 4 in which said interconnecting means modifies the setting normally obtained by said pressure responsive means.

9. A fuel control system as defined in claim 6 in which one side of said diaphragm is subjected to a substantially constant pressure and the other side of said diaphragm is subjected to a pressure control by said second governor for resetting said first governor.

10. A fuel control system as defined in claim 9 in which said interconnecting means resets said control means for said first governor a predetermined degree beyond the setting of said pressure responsive means.

References Cited
UNITED STATES PATENTS

| | | | |
|---|---|---|---|
| 3,050,941 | 8/1962 | Rogers | 60—39.16 XR |
| 3,332,232 | 7/1967 | Bevers | 60—39.16 XR |
| 3,332,233 | 7/1967 | McQueen | 60—39.16 XR |
| 3,309,868 | 3/1967 | Downing et al. | 60—39.16 |

CARLTON R. CROYLE, Primary Examiner

U.S. Cl. X.R.

60—39.28; 170—135.74